United States Patent Office 3,398,061
Patented Aug. 20, 1968

3,398,061
METHOD OF PURIFYING ETHYLENE GLYCOL BY WATER ADDITION DISTILLATION AND TREATMENT WITH ACTIVATED CLAY
Horst Taul, Kassel-Bettenhausen, Germany, assignor to Glanzstoff AG, Wuppertal, Germany
No Drawing. Filed Apr. 13, 1967, Ser. No. 630,518
Claims priority, application Germany, Apr. 16, 1966, V 30,864
3 Claims. (Cl. 203—18)

ABSTRACT OF THE DISCLOSURE

A method of purifying ethylene glycol contaminated by its oxidation products, especially by aldehyde impurities, by adding a small amount of water to the crude glycol and distilling off the water from the crude mixture under partial vacuum, the glycol then being distilled under further reduced pressure after adding thereto a pulverulent acid-activated montmorillonite or hectorite clay. The method is particularly useful for purifying ethylene glycol recovered as a by-product in the production of a polyester by polycondensation of diethylene glycol terephthalate.

---

The production of fiber-forming polyesters, especially polyethylene terephthalate, is carried out in a well known manner by transesterifying a dialkyl terephthalate and glycol in a first stage and then polycondensing the bis-hydroxyalkyl terephthalate obtained from this first stage at high temperatures. During this polycondensation, there accrues as a by-product large amounts of glycol. In order to achieve an economical process for the production of the polyester, it is essential to again recover the gycol, purify it and return it to the transesterification stage. To provide an effective purification, not only must the discoloration of the glycol be removed but also its oxidation products, e.g. aldehydes, oxygen-containing acids such as hydroxy acids.

It has already been proposed that the glycol be purified by mixing and heating it at 70–130° C. in the presence of certain pulverulent acid-activated clays, namely, an acid-hydrolyzed montmorillonite having the composition 50–75% $SiO_2$, 10–23% $Al_2O_3$, 2–7% $Fe_2O_3$, 1–5% MgO, 0.5–4% CaO and 0.2–1.5% $Na_2O$ and CaO, or an acid-activated hectorite having the composition 50–75% $SiO_2$, 0.3–1.5% $Al_2O_3$, 0.3–2.5% $Fe_2O_3$, 0.2–5.5% CaO and 10–30% MgO. The glycol is then separated from the solid material by filtration. This process is described in detail and claimed in the copending application of Horst Taul, the inventor herein, and Hubert Kögler, Ser. No. 548,067, filed May 6, 1966.

The previously developed process leads to a very extensive removal of the oxidation products of the glycol present as impurities. For example, the aldehyde content of the purified glycol, which can be regarded as an accurate measure of impurities, can be reduced to less than 50 p.p.m. A glycol purified in this way is useful for immediate recycle to the transesterification stage of the polycondensation process.

Although good results have been achieved in this earlier process, it does require special equipment for the treatment with an acid-activated clay and subsequent filtration, namely a special heated vessel equipped with a stirrer and means for filtration. Since normal purification on an industrial scale is immediately followed by distillation of the glycol and distillation equipment has been standardized for this purpose, it would be of considerable advantage to carry out an improved purification of the glycol in this existing equipment.

It is therefore the object of the present invention to provide an improvement in the purification of the glycol contaminated by its oxidation products so that these impurities can be extensively removed while employing conventional distillation apparatus.

In accordance with the present invention, it has now been found that this object can be attained by first distilling the contaminated glycol to which there has been added water in a ratio of about 1:10 to 1:50 (water:glycol) at a reduced pressure or partial vacuum of 200–250 mm. Hg until the water is substantially completely removed or driven off, and then completing the distillation of the glycol at a further reduced pressure of 10–100 mm. Hg with the addition of 0.1 to 1% by weight, preferably 0.2 to 0.3% by weight, with reference to the glycol, of at least one of the above noted finely divided or pulverulent acid-activated clays, i.e. montmorillonite or hectorite having the same composition as the clays used in the process of the copending application.

The process according to the present invention is best illustrated by the following example wherein all percentages are by weight.

In a distillation still maintained under a vacuum, 30,000 liters of the contaminated ethylene glycol obtained from the polycondensation stage in the production of polyethylene terephthalate are first introduced together with 3,000 liters of water. Distillation is then carried out under a reduced pressure of 250 mm. Hg and at a column-top-temperature of 75° C. until practically no more water distills off. Next, 75 kg. (corresponding to 0.26% by weight with reference to the glycol) of an acid-activated montmorillonite is mixed with 200 liters of ethylene glycol, introduced into the distillation still, and the vacuum distillation then being carried to completion under a reduced pressure of 50 mm. Hg at a temperature of about 150° C. The distillate consisting essentially of purified ethylene glycol exhibits an aldehyde content of only 0.0001 to 0.0002%, while the aldehyde content of the initial crude or contaminated glycol amounts to 0.0038%.

The acid-activated montmorillonite used in the foregoing example is obtainable under the name "Tonsil L80" from Südchemie AG, Munich, Germany, and has the required composition as prescribed herein. However, a montmorillonite from any source is equally suitable since this type of clay is readily available and its composition is readily determined in any particular instance. It should be noted that such clays are normally identified by a range of the content of each individual component, and the precise composition in terms of each component is neither critical nor essential.

Substantially the same results as in the foregoing example can be achieved by using an acid-activated hectorite in place of the montmorillonite. The techniques for the acid-activation of such clays are well known and do not require an extensive explanation.

The process of the invention essentially requires the addition of water and its removal by distillation before carrying out a second distillation in the presence of relatively small amounts of the acid-activated clay. When following this precise procedure, one achieves a highly desirable alternative method of purifying ethylene glycol obtained as a by-product in the production of polyethylene terephthalate, so as to obtain a very extensive removal of aldehydes or other undesirable oxidation products while making use of readily available commercial distillation equipment.

The invention is hereby claimed as follows:

1. An improved method of purifying ethylene glycol contaminated with its oxidation products which comprises: first distilling the contaminated glycol to which there has been added water in the ratio of water:glycol of about 1:10 to 1:50 at a pressure of 200–250 mm. Hg until the water is substantially completely removed; and then completing the distillation at a pressure of 10–100 mm. Hg with the addition to the glycol being distilled of 0.1 to 1% by weight, with reference to the glycol of a finely divided acid-activated clay selected from the group (A) montmorillonite of the composition 50–75% $SiO_2$, 10–23% $Al_2O_3$, 2–7% $Fe_2O_3$, 1–5% MgO, 0.5–4% CaO and 0.2–1.5% $Na_2O$ and CaO, and (B) hectorite of the composition 50–75% $SiO_2$, 0.3–1.5% $Al_2O_3$, 0.3–2.5% $Fe_2O_3$, 0.2–5.5% CaO and 10–30% MgO.

2. A method as claimed in claim 1 wherein about 0.2 to 0.3% by weight of said clay is added to said glycol after removal of the water and prior to said completion of the distillation.

3. A method as claimed in claim 1 wherein said contaminated ethylene glycol is that obtained as a by-product in the polycondensation of diethylene glycol terephthalate and the impurities therein are oxidation products of the glycol consisting predominately of aldehydes.

References Cited

UNITED STATES PATENTS

| | | | |
|---|---|---|---|
| 2,510,548 | 6/1950 | Brunjes | 203—18 |
| 2,916,525 | 12/1959 | Giesen et al. | 260—637 |
| 3,011,002 | 11/1961 | Giesen et al. | 260—637 |
| 3,311,544 | 3/1967 | Riehl et al. | 203—36 |

FOREIGN PATENTS 574,079   4/1959   Canada.

WILBUR L. BASCOMB, JR., *Primary Examiner.*